Patented May 22, 1928.

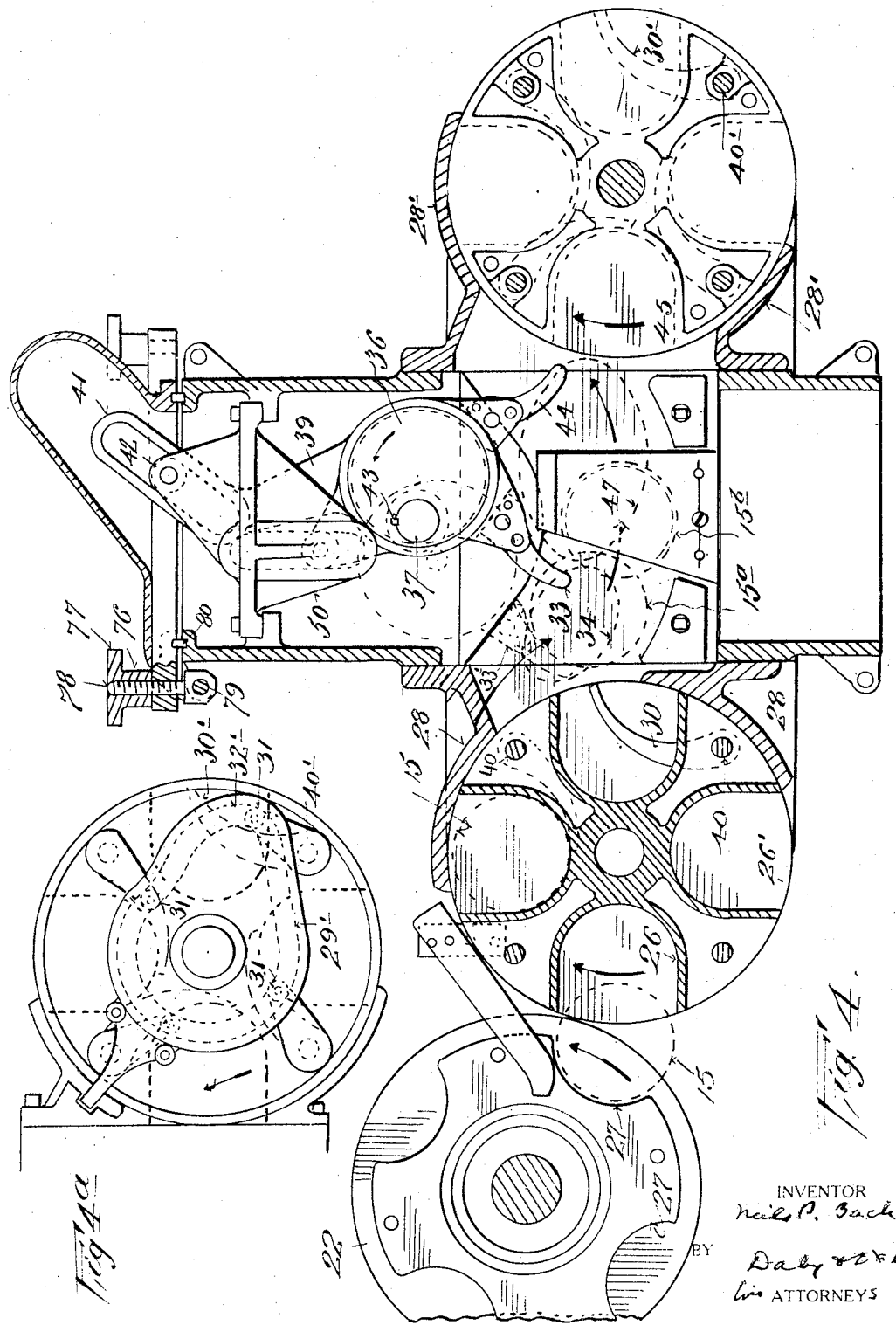

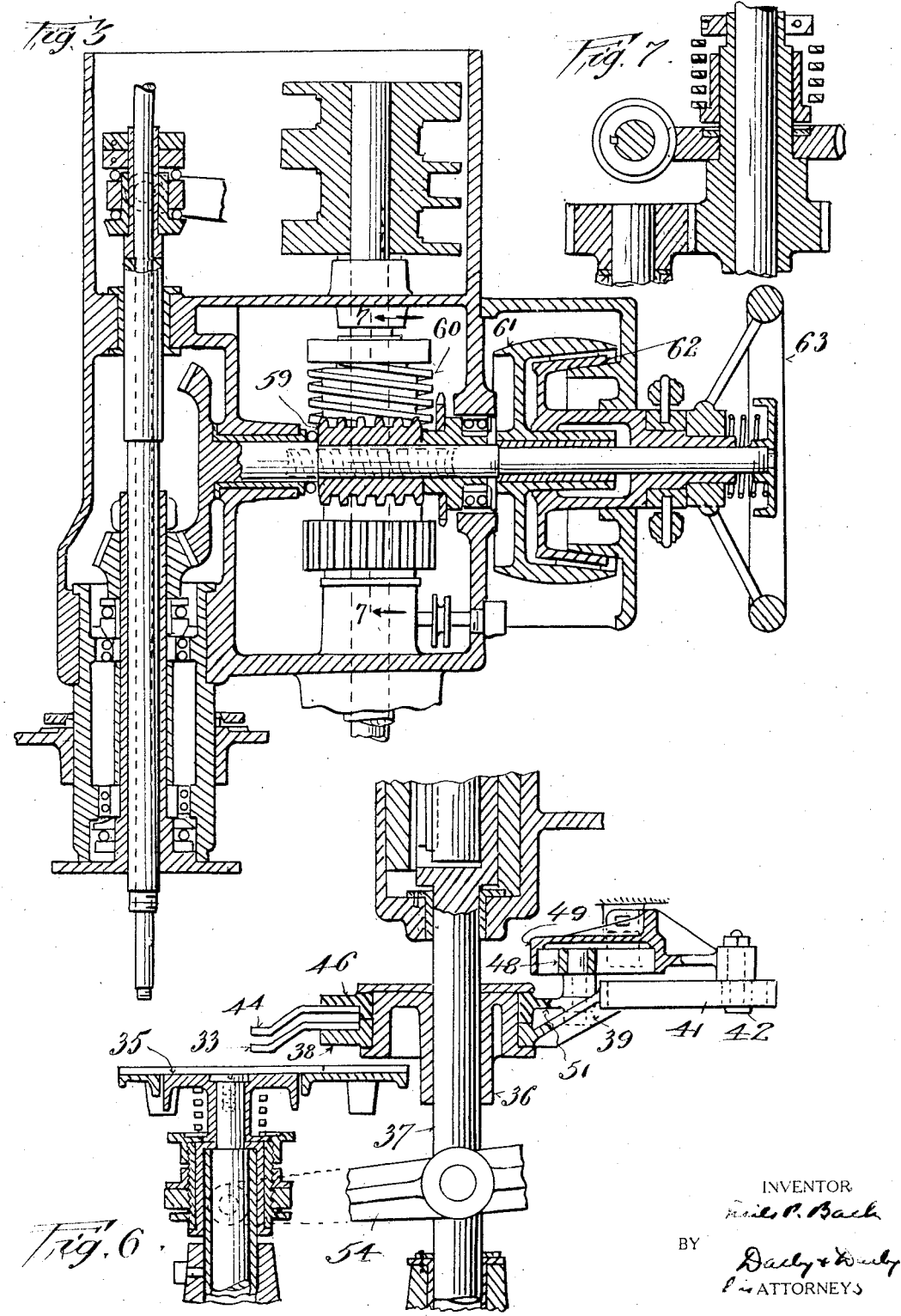

1,670,925

UNITED STATES PATENT OFFICE.

NEILS P. BACH, OF MILLBURN, NEW JERSEY, ASSIGNOR TO THERMOKEPT CORPORATION, OF NEW YORK, N. Y., A CORPORATION OF DELAWARE.

VACUUM CAN-SEALING MACHINE AND METHOD.

Application filed January 12, 1924. Serial No. 685,783.

This invention relates to improvements in can-sealing machines of the vacuum sealing type and in an improved mode of procedure for capping filled cans or containers and then sealing said containers in vacuo after the contents of said containers have been subjected to vacuumization.

It is one of the objects of my invention to produce a comparatively simple apparatus for effecting the sequence of operation in an economical and expeditious manner, and whereby proper vacuum treatment and perfect seals are assured.

Another object includes the production of a can sealing unit wherein the vacuum sealing element is greatly simplified and wherein certainty of operations to produce air-tight seals is practically perfect.

A further object includes the provision of an exceedingly efficient and simple can handling mechanism which operates wholly within the vacuum chamber.

A still further object includes the provision of a drive mechanism which is capable of being adjusted or removed as a unit.

Another object of my invention embraces a sequence of operations and orderly procedure whereby open, filled containers are arranged and spaced apart; are supplied with marked covers, which covers are loosely attached to said containers, while the containers continue their uninterrupted travel into a vacuumizing and sealing chamber to be there subjected to vacuumization and sealing, and whereupon said containers, with the sealed and treated food product, are ejected from the machine as the finished article.

Other objects will appear hereinafter, and I attain these objects by the mechanism illustrated in the accompanying drawing, in which:

Fig. 4 is a view taken on lines 4—4 of Fig. 2.

Figure 1:
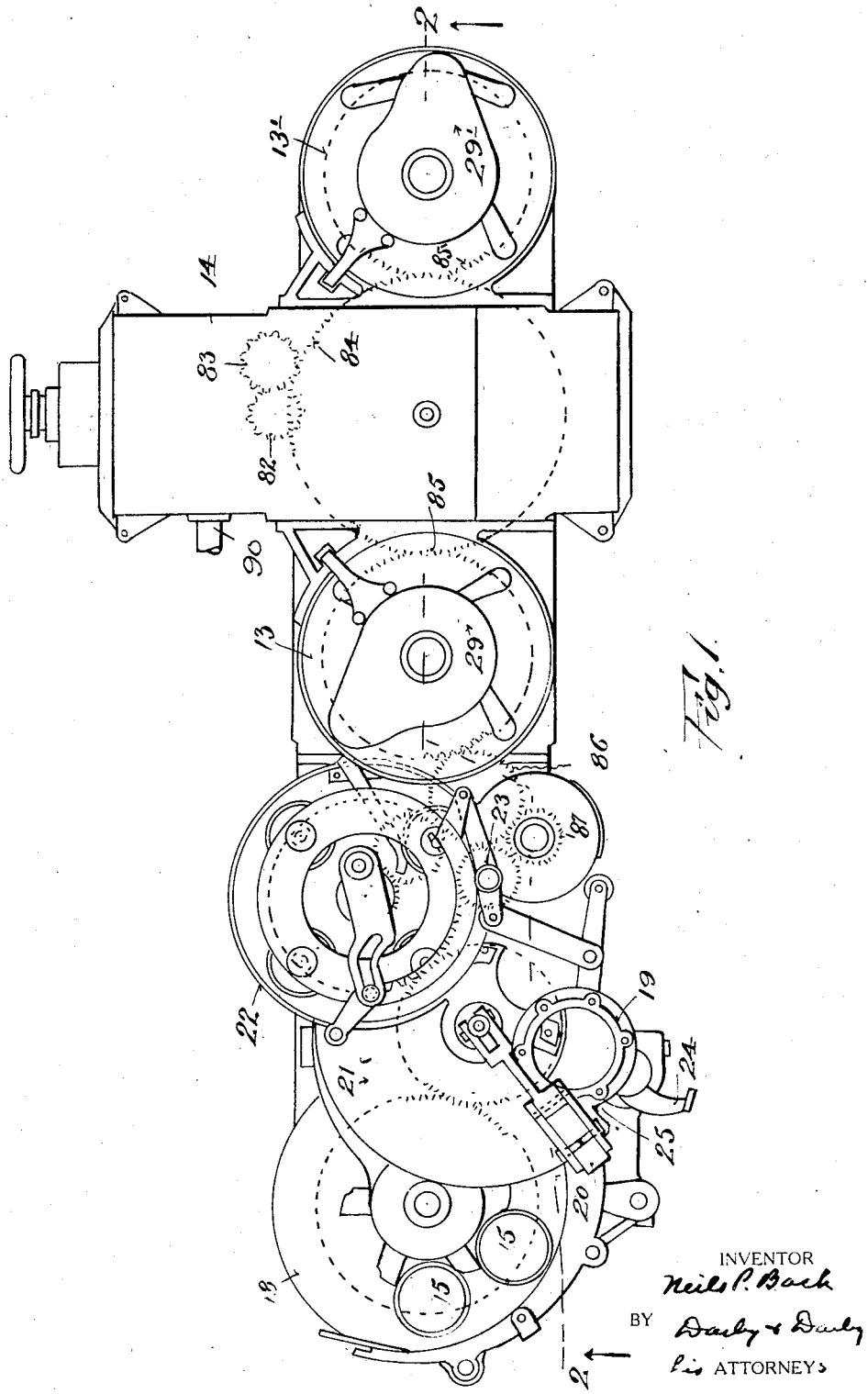
Fig. 1 is a plan view of a construction embodying the principles of my invention.
Figure 2:
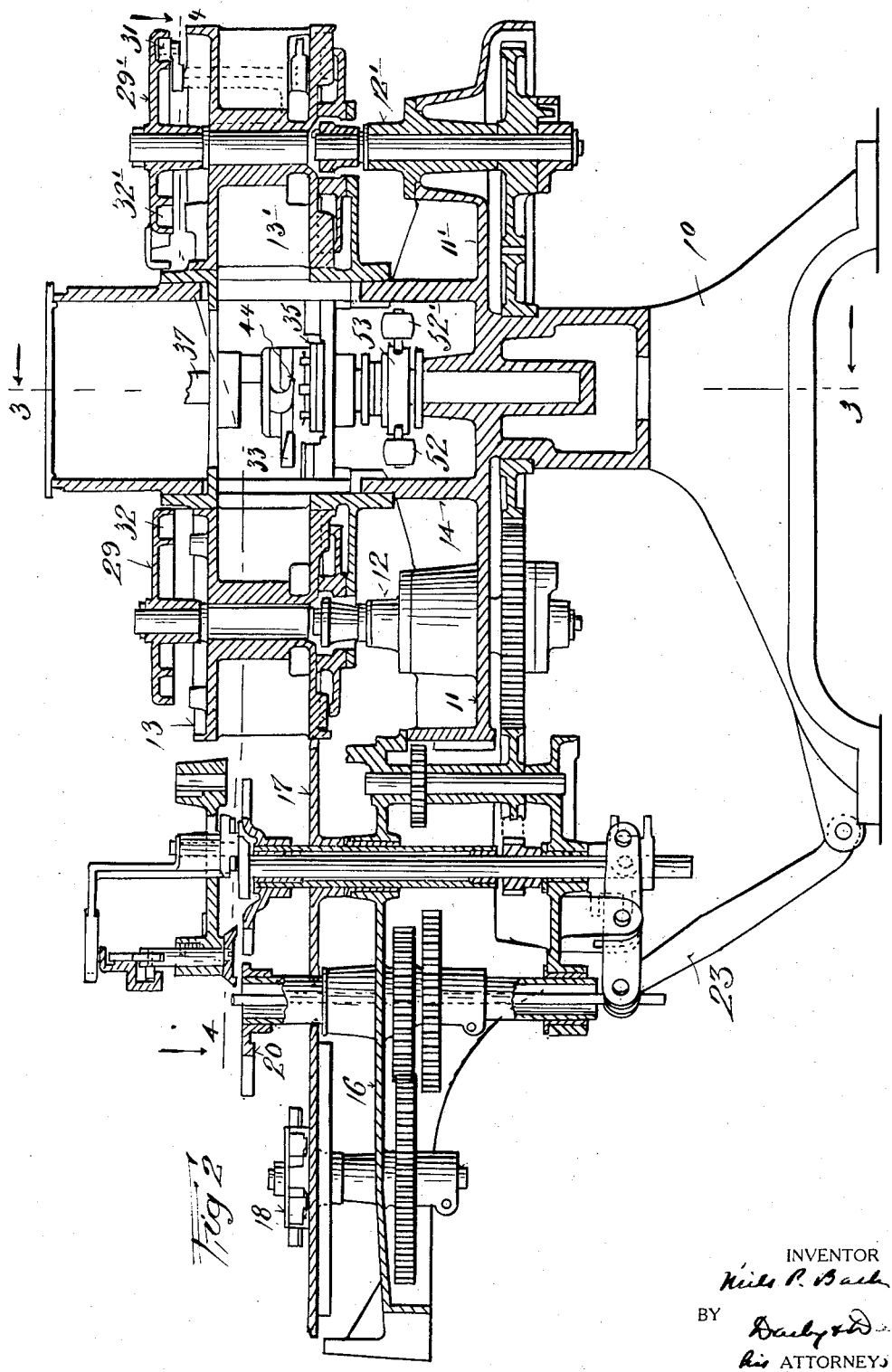
Fig. 2 is a view, partially in section, taken substantially on lines 2—2 of Fig. 1.

Fig. 4ª is a plan view of one of the rotary can moving members or valves.

Fig. 5 is an enlarged view giving details of my improved unit drive.

Fig. 6 is an enlarged detail view showing the can supporting and can moving members.

Fig. 7 is a view taken on lines 7—7 of Fig. 5.

Like numbers refer to similar parts throughout the several views.

It has heretofore been proposed to seal containers in vacuo and to supply covers to said containers within the vacuum sealing chamber to thereby obtain a continuous and uninterrupted flow of containers through said cover supplying and sealing station. To secure this result, however, requires very elaborate and expensive sealing and cover supplying mechanism and a proportionally large vacuum chamber, with attending difficulties in the successful and efficient operation of the apparatus and in the successful sealing and handling of the containers.

One of the prime objects of my invention, accordingly, resides in the production of a greatly simplified and proportionally more efficient mechanism, by which I am enabled to smoothly and progressively handle and seal open, filled containers in accordance with the principles of my improved mode of operation as herein disclosed and as is more fully described below.

As a practical embodiment of my invention, and as showing one form of apparatus for carrying out the mode of operation, I will now describe my improved mechanism or machine, reference being made to the accompanying drawing which is, however, merely illustrative as exemplifying a preferred form of apparatus suitable for effecting my invention.

This apparatus comprises a main base support 10 of suitable capacity and dimensions to support the several elements recited below. This main base support extends laterally to form valve carrying flanges 11, 11' having valve bearings 12, 12' wherein are seated, respectively, the in-carrying valve 13 and the out-carrying or discharge valve 13'. These valves are arranged on either side of the vacuum-tight sealing chamber 14 and operate respectively to deliver thereto and receive therefrom containers 15 in a steady and uninterrupted stream or flow when the apparatus is operated at full capacity.

Attached to flange 11 is a frame or support 16 which, with the can table 17, forms supporting means for the can spacing and selecting disk 18, the cover supplying mechanism 19, the cover stamping or making device 20, the can moving intermediate disk 21, the can moving and shaping disk and mechanism 22, with its can cover attaching lugs 23, and the cover releasing mechanism 24. The cover releasing mechanism supplies covers to passing cans after these have been stamped or marked at the marking station 25, after the manner fully set forth and described in my co-pending application Serial No. 543,126, filed March 11, 1922, and patented March 10, 1925, as Patent No. 1,529,416. From this station, as is disclosed in said application, the filled cans or containers are carried by the intermediate disk 21 to the can shaping disk 22 for loosely attaching the covers to the rounded cans by the attaching lugs 23, of which there are usually three (only one is shown herein). The rotation of the disk 22 carries the successive cans through the cover attaching station and delivers them successively to the rotary valve 13 and into one of the four pockets 26, as said pocket comes into opposition to the discharge pocket 27 of disk 22.

Both the in-carrying valve 13 and the out-carrying or discharge valve 13' are seated radially by difference of atmospheric pressures against their respective valve seats 28 and 28'. Each valve is provided with a cam plate 29 or 29' and each valve pocket carries an ejector finger 30 or 30'. These fingers are pivotally mounted on pivot pins 40 or 40' and are operated by cam followers 31 operating in the cam grooves 32 or 32'. By reason of the relative position of the cam plate to its individual valve, the ejector finger for each pocket lies dormant within its recess until, at the proper moment, it becomes active to kick out the can from its valve pocket, either into the vacuum chamber for sealing, or out of the pockets of the out-carrying valve after the cans and their contents have been vacuumized and the cans sealed in the manner more fully stated below. In Fig. 4, the ejector fingers 30, 30' are in ejector position for the aligned pockets of valves 13 and 13'. As the can, with its cap loosely attached thereto, is moved into the vacuumizing chamber 14, finger 33 assumes the position shown in dotted lines 33' to thus engage can shown in dotted lines 15ª. From this position the can is moved by finger 33 on to the sealing table 35. In thus moving the can from its entrance position (15ª) to its sealing position (15ᵇ) the tip of finger 33 describes an elliptical path 34. This movement is effected by the combined action of the eccentric pulley 36, the drive shaft 37, the finger carrying band 38, cam arm 39, cam guide 41 in which cam roller 42 oscillates back and forth with each rotation of shaft 37 and thereby rotating pulley 36 which is fastened on said shaft by proper means, as a key 43.

Figure 3:
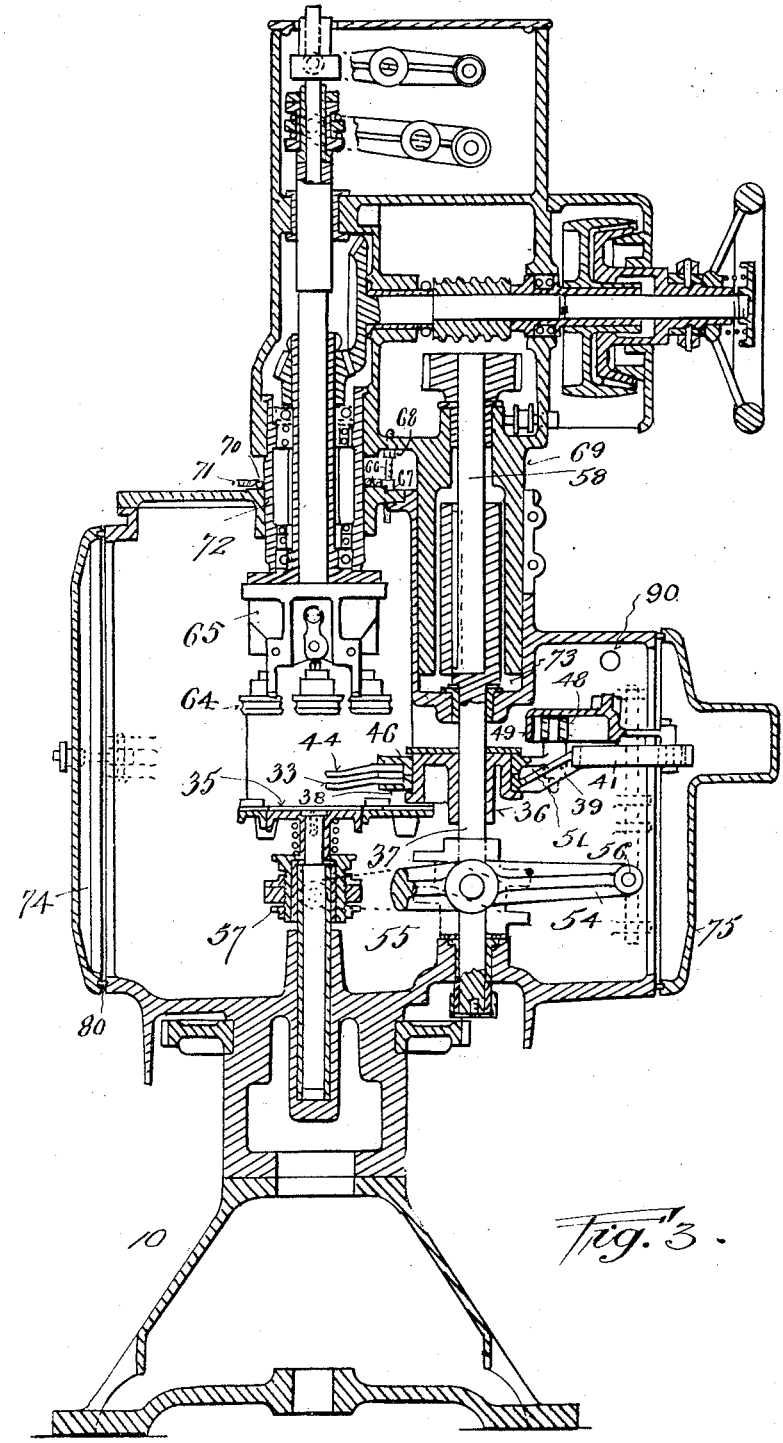
Fig. 3 is a view taken on lines 3—3 of Fig. 2, looking in the direction of the arrows.

A can removing finger 44, similar to the can positioning finger 33, removes the cans from the sealing table after they are sealed and places them into one of the several properly positioned pockets 45 of valve 13' to be carried out of the vacuumized space and deposited or ejected by its ejector finger 30' at the valve discharge position. The can removing finger 44 is mounted on its carrying band 46, which, like band 38, is mounted on pulley 36 and is caused to describe an elliptical path 47 as the cam roller 48 moves back and forth in its cam groove 49 in the common holding plate 50. An arm 51 unites the cam roller 48 to its operating band 46, as is best shown in Figs. 3 and 6. Drive shaft 36 also carries a pair of rollers 52 on a holding yoke 53. This yoke is fastened on the shaft and rotates therewith and consequently rollers 52 likewise rotate to cause the sealing table to periodically move up and down. This movement is accomplished by the table moving member 54, which is provided with directional roller grooves 55 wherein rollers 52 operate.

This table moving member is pivotally mounted at 56 on a frame at one end, and at the other end similarly mounted at 57 on the lower part of the table to thereby move the same up and down in the manner heretofore stated. The drive shaft 37 is slidably engaged with its drive element 58 to permit adjustment. The drive element is operated in any suitable manner, as by a worm gear 59 intermeshing with its worm 60 and driven from a suitable source of power, as a drive pulley 61. This drive pulley is provided with means for frictionally engaging the same, which means, as a friction clutch 62, is operated by wheel 63.

As the cans are moved into position by the can positioning finger and placed upon the sealing table, they are at the proper time lifted into position for the members 64 of the sealing head 65 to thereby seal the can in the usual and well-known manner. This sealing head is operated by the drive mechanism above described and is of standard type. A full description thereof will not at this time be given. It is sufficient to say that the sealing head is driven by the drive member 61 which also operates the coordinating elements heretofore described.

The entire drive assembly may be adjusted vertically to accommodate different sized cans. This adjustment is conveniently secured by the adjustment mechanism which is shown in Fig. 3. This mechanism comprises an adjusting screw 66 which is held in position by adjustment nuts 67 and 68 to thereby lock the adjustment screw in position. By means of this mechanism the head frame 69 may be lowered or raised within the limits, and as now shown said mechanism is in its upper limit. A gasket 70 held in position by a washer 71 provides an air-tight seat surrounding the main holding sleeve 72. As an air-tight seal for the drive shaft 37 I provide an oil seal 73 wherein the shaft operates. Through a suitable connection 90 vacuumization is maintained within the chamber 14 by means of a proper pump (not shown).

The sealing chamber itself is further provided with front and rear inspecting doors 74 and 75 respectively. These doors are provided with proper locking means, one of which, for the rear member, is shown at 76. This locking means comprises a nut 77 engaging bolt 78, which bolt is pivotally mounted on the main frame at 79 and can be moved out of engagement of the door when screwed loose. The opposite end of said door is fastened by the usual hinge, not shown. To secure a positive air-tight seat a suitable gasket 80 is provided. The front door construction is similarly sealed.

The entire can moving and can sealing mechanism is driven from a main drive 82, which is best shown in Fig. 1. This drive engages a drive cog 83 which, in turn, engages the main drive cog 84. Cooperating with drive cog 84 are the valve drives 85 and 85'. Valve drive or gear 85 engages with the can moving mechanism, of which gear 86 is shown. Gear 86 engages the can cover operating mechanism by a gear 87 and also the drive gear for rotating a can shaping disk mechanism. The intermediate can moving disk is driven from this mechanism, as is also the can selecting disk.

From the description thus far given, the operation of my device will be readily understood. Open filled cans or containers, indicated in general by the numeral 15, are plied from the supply station and fed on the selecting disk 18, where these cans are spaced in uniform position. By continuous movement these cans move through the cover receiving station 19, where a cover is stamped and supplied to the top of the can. The cans continue to move at a uniform rate on to the can shaping and cover attaching disk, generally indicated by 22. At this position the cans move through the can cover attaching lugs which cause the can cover to be loosely attached to the can at one or more places. The cans then continue to move without interrupted motion into one of the pockets of the in-carrying valve. This valve rotates in an air-tight seat, as heretofore stated, and permits the cans to be discharged into the vacuum or sealing chamber 14. As the cans reach the proper position, finger 33 engages the same and positions it on to the sealing table 35. The can is now sealed by the operation heretofore stated, and moved out by finger 44 into the can ejecting valve 13', to be thereby moved and ejected into the open air as a sealed, vacuumized and finished product.

The advantages of this mechanism are numerous, and among the chief of which are uniformity and certainty of operation, there is no waste due to spilling of the materials to be sealed, the material is vacuumized before it is sealed, and the seal is, almost without exception, absolute and perfect.

Other advantages will appear to those versed in the art, but what I claim as new and useful and of my own invention, and desire to secure by Letters Patent is:—

1. In a vacuumizing and can sealing machine, a vacuumizing chamber, means for causing open, filled containers to be speedily moved into said vacuumizing chamber, fingers and means for moving said fingers in elliptical paths within said chamber for intercepting said container to thereby bring the same to a speedy rest, for sealing, and to thereafter cause the sealed containers to be speedily removed from the sealing station.

2. In a vacuumizing and can sealing machine, a vacuumizing chamber, a sealing platform in said chamber, means for causing open, filled containers to be moved into said vacuumizing chamber, fingers within said chamber and means to cause the points of said fingers to move in elliptical paths to move said container on to and away from the sealing platform.

3. In a vacuumizing and can sealing chamber, an adjustable head, means for adjusting said head, a unit driving mechanism in said head, a main drive shaft extending into said vacuum chamber, an eccentrically mounted disk on said shaft, straps on said disk, a pair of companion members attached to each of said straps, and a direction guide with which one of said members cooperates to thereby direct the path of the other of said companion members.

In testimony whereof I have hereunto set my hand on this 10th day of January, A. D. 1924.

NEILS P. BACH.